(12) United States Patent
Sung et al.

(10) Patent No.: US 11,526,219 B2
(45) Date of Patent: Dec. 13, 2022

(54) DEVICE FOR OUTPUTTING INFORMATION LINKED WITH STYLUS PEN CONNECTED TO ELECTRONIC DEVICE, AND METHOD RELATED THERETO

(71) Applicant: Samsung Electronics Co., Ltd., Gyeonggi-do (KR)

(72) Inventors: Jiyeon Sung, Gyeonggi-do (KR); Nahye Kim, Gyeonggi-do (KR); Minkyung Cho, Gyeonggi-do (KR); Kyungmin Kim, Gyeonggi-do (KR); Minwook Na, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/260,316

(22) PCT Filed: Aug. 6, 2019

(86) PCT No.: PCT/KR2019/009771
§ 371 (c)(1),
(2) Date: Jan. 14, 2021

(87) PCT Pub. No.: WO2020/032524
PCT Pub. Date: Feb. 13, 2020

(65) Prior Publication Data
US 2021/0294441 A1 Sep. 23, 2021

(30) Foreign Application Priority Data

Aug. 8, 2018 (KR) .......................... 10-2018-0092423

(51) Int. Cl.
*G06F 3/0354* (2013.01)
*H04W 4/80* (2018.01)
(Continued)

(52) U.S. Cl.
CPC .......... *G06F 3/03545* (2013.01); *G06F 3/038* (2013.01); *G06F 3/04812* (2013.01);
(Continued)

(58) Field of Classification Search
CPC .. G06F 3/03545; G06F 3/038; G06F 3/04812; G06F 3/04842; G06F 3/04883;
(Continued)

(56) References Cited

U.S. PATENT DOCUMENTS 9,436,296 B2 9/2016 Boulanger
10,114,482 B2 10/2018 Boulanger
(Continued)

FOREIGN PATENT DOCUMENTS

KR 10-2007-0096421 A 10/2007
KR 10-2010-0016670 A 2/2010
(Continued)

*Primary Examiner* — Sahlu Okebato
(74) *Attorney, Agent, or Firm* — Cha & Reiter, LLC

(57) ABSTRACT

Disclosed is an electronic device. The electronic device receives a signal including color information of the stylus pen from the stylus pen inserted into a housing, through the wireless communication circuit and the short-range wireless communication protocol, senses that the stylus pen is detached from the housing, performs a memo function associated with the stylus pen, receives at least one stroke input onto the display through the stylus pen, and displays at least one stroke with a color specified from the color information, in response to the received stroke input.

17 Claims, 11 Drawing Sheets

(51) Int. Cl.
*G06F 3/038* (2013.01)
*G06F 3/04812* (2022.01)
*G06F 3/04842* (2022.01)
*G06F 3/04883* (2022.01)

(52) U.S. Cl.
CPC ...... *G06F 3/04842* (2013.01); *G06F 3/04883* (2013.01); *H04W 4/80* (2018.02); *G06F 2203/0384* (2013.01)

(58) Field of Classification Search
CPC .. G06F 2203/0384; G06F 3/0354; G06F 9/44; H04W 4/80; G06T 11/00
See application file for complete search history.

(56) References Cited

U.S. PATENT DOCUMENTS

| | | | |
|---|---|---|---|
| 2013/0335380 A1 | 12/2013 | Griffin et al. | |
| 2014/0055427 A1* | 2/2014 | Kim | G06F 3/0488 345/179 |
| 2016/0048221 A1* | 2/2016 | Boulanger | G06F 3/0481 345/173 |
| 2018/0024708 A1 | 1/2018 | Kim et al. | |
| 2020/0257411 A1 | 8/2020 | Kim et al. | |
| 2021/0200347 A1* | 7/2021 | Ivanov | G06F 3/0442 |

FOREIGN PATENT DOCUMENTS

| KR | 10-2014-0091502 A | 7/2014 |
|---|---|---|
| KR | 10-2017-0041863 A | 4/2017 |
| KR | 10-2017-0088263 A | 8/2017 |
| KR | 10-2018-0011651 A | 2/2018 |

* cited by examiner

DEVICE FOR OUTPUTTING INFORMATION LINKED WITH STYLUS PEN CONNECTED TO ELECTRONIC DEVICE, AND METHOD RELATED THERETO

CROSS REFERENCE TO RELATED APPLICATIONS

This application is a National Phase Entry of PCT International Application No. PCT/KR2019/009771, which was filed on Aug. 6, 2019, and claims a priority to Korean Patent Application No. 10-2018-0092423, which was filed on Aug. 8, 2018, the contents of which are incorporated herein by reference.

TECHNICAL FIELD

Embodiments disclosed herein relate to an apparatus for outputting information regarding a stylus pen connected with an electronic device, and a method for the same.

BACKGROUND ART

An electronic device may include a stylus pen that may be inserted into the electronic device or detached from the electronic device. The stylus pen may provide an environment in which a user inputs handwriting on a display of the electronic device.

The stylus pen may interact with the electronic device through a short-range wireless communication protocol as well as an electromagnetic induction scheme, and the electronic device may establish a link, based on the short-range wireless communication protocol, with a plurality of stylus pens as well as a single stylus pen.

DISCLOSURE

Technical Problem

The electronic device may receive a user input only through one stylus pen, with which a wireless communication link is established, of a plurality of stylus pens, to reduce power consumption and to prevent malfunction. Information regarding the stylus pen linked with the electronic device may be necessary to be fed back, such that a user identifies the stylus pen, which is connected with the electronic device based on the short-range wireless communication protocol, of the plurality of pens.

The stylus pen does not include a separate display, due to a mounting space and power consumption. Accordingly, there is a limitation in providing, for a user, information regarding a battery state or the state of a wireless communication link.

Various embodiments disclosed herein may provide an apparatus and a method for outputting information regarding a stylus pen connected with an electronic device.

Technical Solution

According to an embodiment disclosed herein, an electronic device may include a housing, a display viewed through a portion of the housing, a wireless communication circuit positioned inside the housing, a processor positioned in the housing and operationally connected with the display and the wireless communication circuit, and a memory positioned inside the housing, and operationally connected with the processor. The memory stores instructions that when executed, cause the processor to establish a wireless communication link with a stylus pen, which is inserted into an inner space of the housing, based on a short-range wireless communication protocol, through the wireless communication circuit, receive a signal including color information of the stylus pen from the stylus pen, through the wireless communication circuit and the short-range wireless communication protocol, sense that the stylus pen is detached from the housing, perform a memo function associated with the stylus pen, in response to the detaching of the stylus pen, receive at least one stroke input onto the display through the stylus pen, and display at least one stroke with a color defined based on the color information, in response to the received stroke input.

According to an embodiment disclosed herein, a method of an electronic device may include establishing a wireless communication link, which is based on a short-range wireless communication protocol, with a stylus pen, receiving a signal, which includes color information of the stylus pen, from the stylus pen, through the short-range wireless communication protocol, sensing that the stylus pen is detached from an inner space of the electronic device, performing a memo function associated with the stylus pen, in response to the detaching of the stylus pen, receiving at least one stroke input onto a display of the electronic device through the stylus pen, and displaying at least one stroke with a color, which is specified from the color information, in response to the received stroke input.

According to an embodiment disclosed herein, an electronic device may include a housing, a display viewed through a portion of the housing, a wireless communication circuit positioned inside the housing, a stylus pen which is able to be inserted into an inner space of the housing, a processor positioned inside the housing and operationally connected with the display and the wireless communication circuit, and a memory positioned inside the housing, and operationally connected with the processor. The memory stores instructions that when executed, cause the processor to establish a wireless communication link with a stylus pen, which is detachably inserted into an inner space of the housing, based on a short-range wireless communication protocol, through the wireless communication circuit, receive a signal including color information of the stylus pen from the stylus pen, through the wireless communication circuit and the short-range wireless communication protocol, perform a memo function or a memo application associated with the stylus pen, receive at least one stroke input onto the display through the stylus pen, and display, through the display, at least one stroke with a color defined based on the color information, in response to the received stroke input.

Advantageous Effects

According to embodiments of the disclosure, the electronic device may display information regarding the stylus pen connected with the electronic device, thereby preventing a malfunction from occurring due to the use of another stylus pen.

Besides, a variety of effects directly or indirectly understood through the disclosure may be provided.

DESCRIPTION OF DRAWINGS

In the following description made with respect to the accompanying drawings, similar components will be assigned with similar reference numerals.

MODE FOR INVENTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
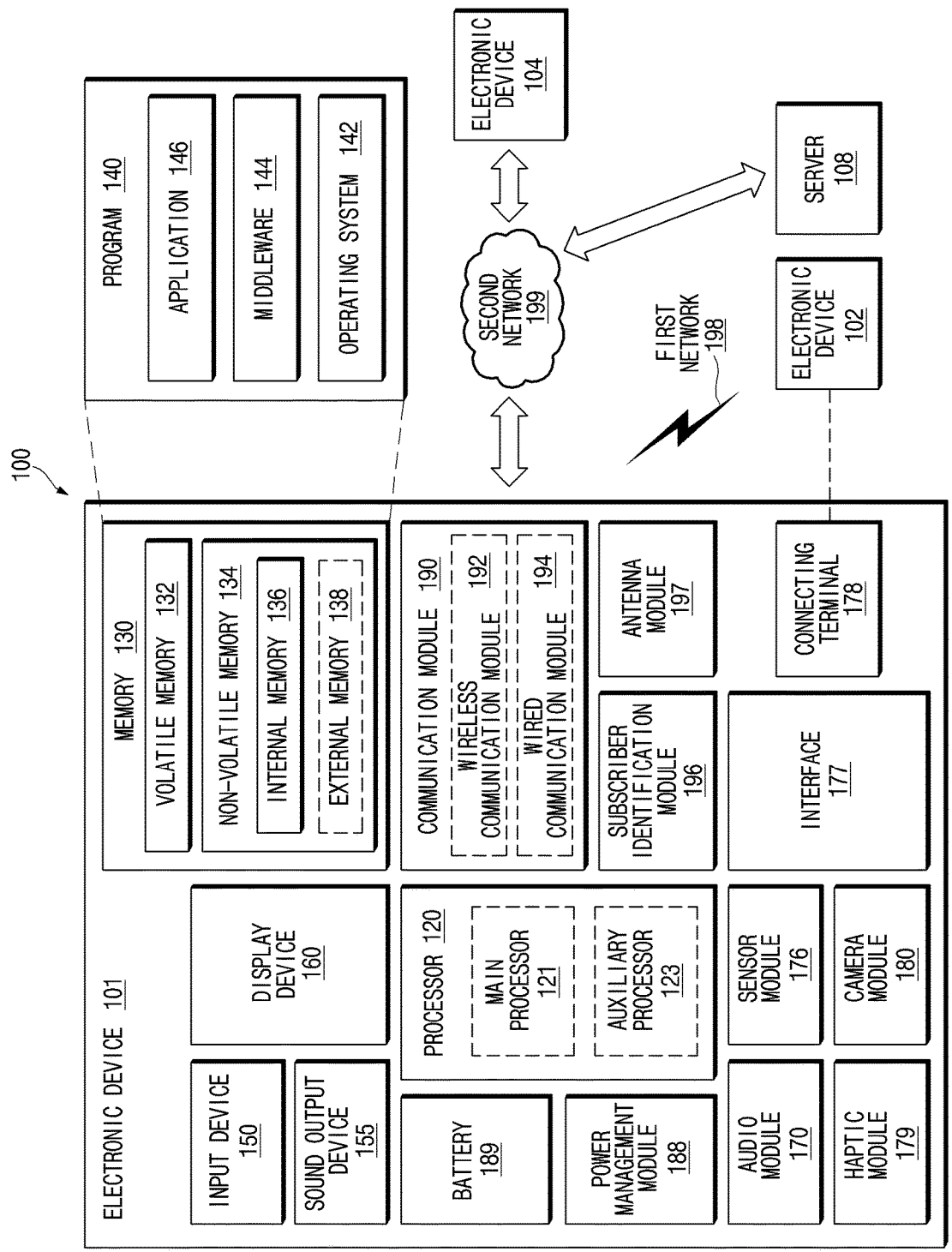
FIG. 1 is a block diagram illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (MI) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuit to control a corresponding one of the display, hologram device, and projector. According to an embodiment, the display device 160 may include touch circuit adapted to detect a touch, or sensor circuit (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
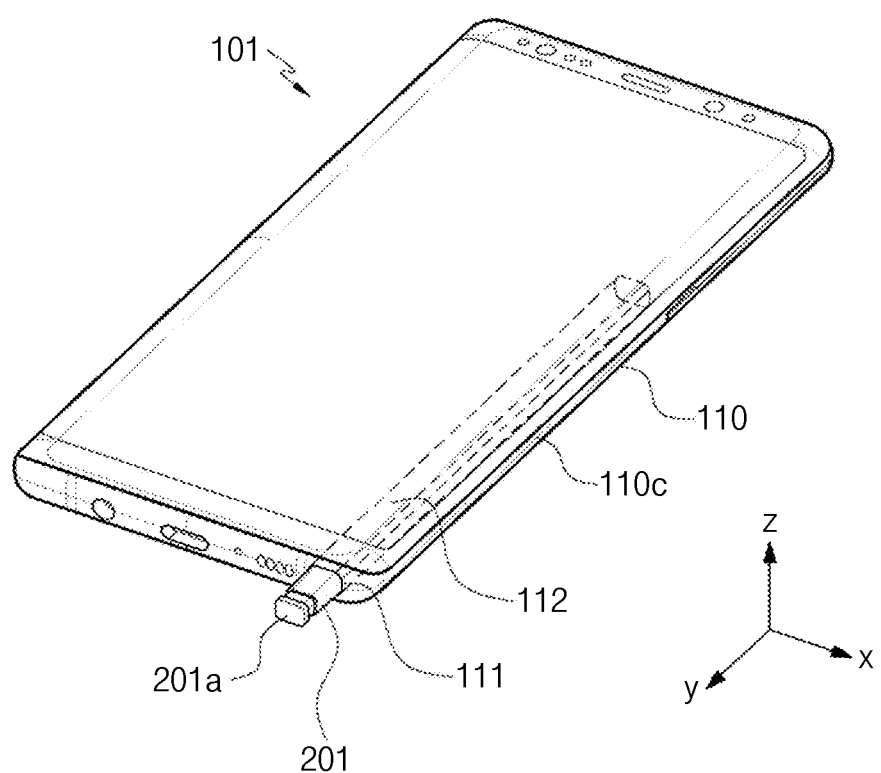
FIG. 2 is a perspective view of an electronic device including a digital pen, according to various embodiments.

FIG. 2 is a perspective view of the electronic device 101 including a digital pen 201, according to various embodiments.

Referring to FIG. 2, according to an embodiment, the electronic device 101 may include components illustrated in in FIG. 1 and may include the structure in which the digital pen 201 (e.g., the stylus pen) is inserted. The electronic device 101 may include a housing 110 and include a hole 111 formed in a portion of the housing 110, for example, a portion of a side surface 110C. According to one embodiment, the electronic device 101 may include a receiving space 112 communicating with the hole 111, and the digital pen 201 may be inserted into the receiving space 112. According to embodiments that are illustrated, the digital pen 201 may include a button 201a, which is able to be pressed, at one end portion thereof such that the digital pen 201 is easily ejected from the receiving space 112 of the electronic device 101. When the button 201a is pressed, repulsion mechanisms (e.g., at least one spring) configured in association with the button 201a are activated, such that the digital pen 201 may be ejected from the receiving space 112.

Figure 3:
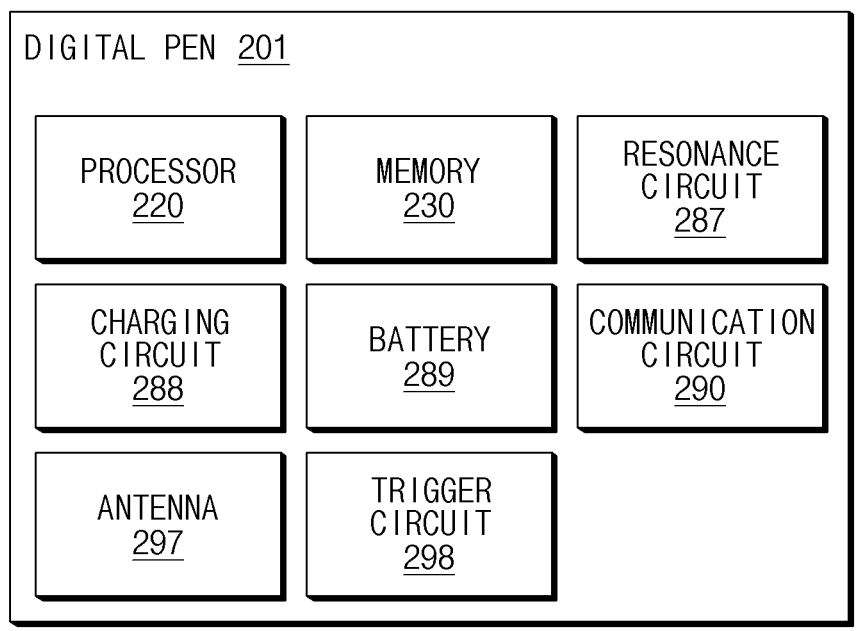
FIG. 3 is a block diagram of a digital pen, according to various embodiments.

FIG. 3 is a block diagram of the digital pen 201, according to various embodiments.

Referring to FIG. 3, according to an embodiment, the digital pen 201 may include a processor 220, a memory 230, a resonance circuit 287, a charging circuit 288, a battery 289, a communication circuit 290, an antenna 297, and/or a trigger circuit 298. In an embodiment, the processor 220 of the digital pen 201, at least a portion of the resonance circuit 287, and/or the communication circuit 290 may be configured on a printed circuit board (PCB) or in the form of a chip. The processor 220, the resonance circuit 287 and/or the communication circuit 290 may be electrically connected with the memory 230, the charging circuit 288, the battery 289, the antenna 297 or the trigger circuit 298. In an embodiment, the digital pen 201 may include only both of the resonance circuit and the button.

According to an embodiment, the processor 220 may include a generic processor configured to execute a customized hardware module or software (e.g., an application program). The processor 220 may include a hardware component (function) or software component (program) including at least one of various sensors, a data measurement module, an input/output interface, a module for managing the state or environment of the digital pen 201, or a communication module, which is provided in the digital pen 201. The processor 220 may include, for example, one of hardware, software, or firmware or the combination of two of the hardware, software, or firmware. According to one embodiment, the processor 220 may receive a proximity signal corresponding to an electromagnetic field signal generated from a digitizer (e.g., at least a portion of the display device 160) of the electronic device 101 through the resonance circuit 287. When the proximity signal is identified, the resonance circuit 287 may be controlled to transmit an electro-magnetic resonance (EMR) input signal to the electronic device 101.

According to one embodiment, the memory 230 may store information regarding the operation of the digital pen 201. For example, the information may include information for the communication with the electronic device 101 and frequency information regarding the input operation of the digital pen 201.

According to one embodiment, the resonance circuit 287 may include at least one of a coil, an inductor, or a capacitor. The resonance circuit 287 may be used for the digital pen 201 to generate a signal including the resonance frequency. For example, to generate a signal, the digital pen 201 may use at least one of an electro-magnetic resonance (EMR) scheme, an active electrostatic (AES) scheme, or an electrically coupled resonance (ECR) scheme. When the digital pen 201 transmits a signal through the EMR scheme, the digital pen 201 may generate a signal including a resonance frequency, based on an electromagnetic field generated from an inductive panel of the electronic device 101. When the digital pen 201 transmits a signal through the AES scheme, the digital pen 201 may generate a signal using capacity coupling with the electronic device 101. When the digital pen 201 transmits a signal through the ECR scheme, the digital pen 201 may generate a signal including a resonance frequency, based on an electric field generated from the capacitive device of the electronic device. According to one embodiment, the resonance circuit 287 may be used to change the intensity or frequency of the electromagnetic field depending on the operation state of the user. For example, the resonance circuit 287 may provide a frequency for recognizing a hovering input, a drawing input, a button input, or an erasing input.

According to an embodiment, the charging circuit 288 may rectify a resonance signal, which is generated from the resonance circuit 287, into a direct current signal and may provide the resonance signal to the battery 289, when connected with the resonance circuit 287 based on the switching circuit. According to an embodiment, the digital pen 201 may determine whether the digital pen 201 is inserted into the electronic device 101 by using the voltage level of a DC signal sensed by the charging circuit 288.

According to an embodiment, the battery 289 may be configured to store power required for operation of the digital pen 201. The battery 289 may include, for example, a lithium-ion battery, or a capacitor, and may be rechargeable or exchangeable. According to one embodiment, the battery 289 may be charged using the power supplied from the charging circuit 288 (e.g., a DC signal (DC power)).

According to one embodiment, the communication circuit 290 may be configured to perform a wireless communication function between the digital pen 201 and the communication module 190 of the electronic device 101. According to one embodiment, the communication circuit 290 may transmit state information and input information of the digital pen 201 to the electronic device 101 through a short-range communication scheme. For example, the communication circuit 290 may transmit direction information (e.g., motion sensor data) of the digital pen 201 obtained through the trigger circuit 298, voice information input through the microphone, or information on a residual battery level of the battery 289. For example, the short-range communication scheme may include at least one of Bluetooth, a Bluetooth low energy (BLE), or a wireless LAN.

According to one embodiment, the antenna 297 may be used to transmit or receive a signal or power to or from the outside (e.g., the electronic device 101). According to one embodiment, the digital pen 201 may include a plurality of antennas 297 and may select at least one antenna 297 suitable for the communication scheme thereof. The communication circuit 290 may exchange a signal or power with the external electronic device through the at least one antenna 297 which is selected.

According to an embodiment, the trigger circuit 298 may include at least one button or a sensor circuit. According to an embodiment, the processor 220 may identify an input type (e.g., touching or pressing) or the type (e.g., an EMR button or BLE button) of the button of the digital pen 201. According to an embodiment, the sensor circuit may generate an electrical signal or data value corresponding to an internal operating state of the digital pen 201 or an external environmental condition of the digital pen 201. For example, the sensor circuit may include at least one of a motion sensor, a residual battery level detecting sensor, a pressure sensor, an optical sensor, a temperature sensor, a geomagnetic sensor, or a biometric sensor. According to an embodiment, the trigger circuit 298 may transmit a trigger signal to the electronic device 101 using an input signal of a button or a signal through a sensor.

Figure 4:
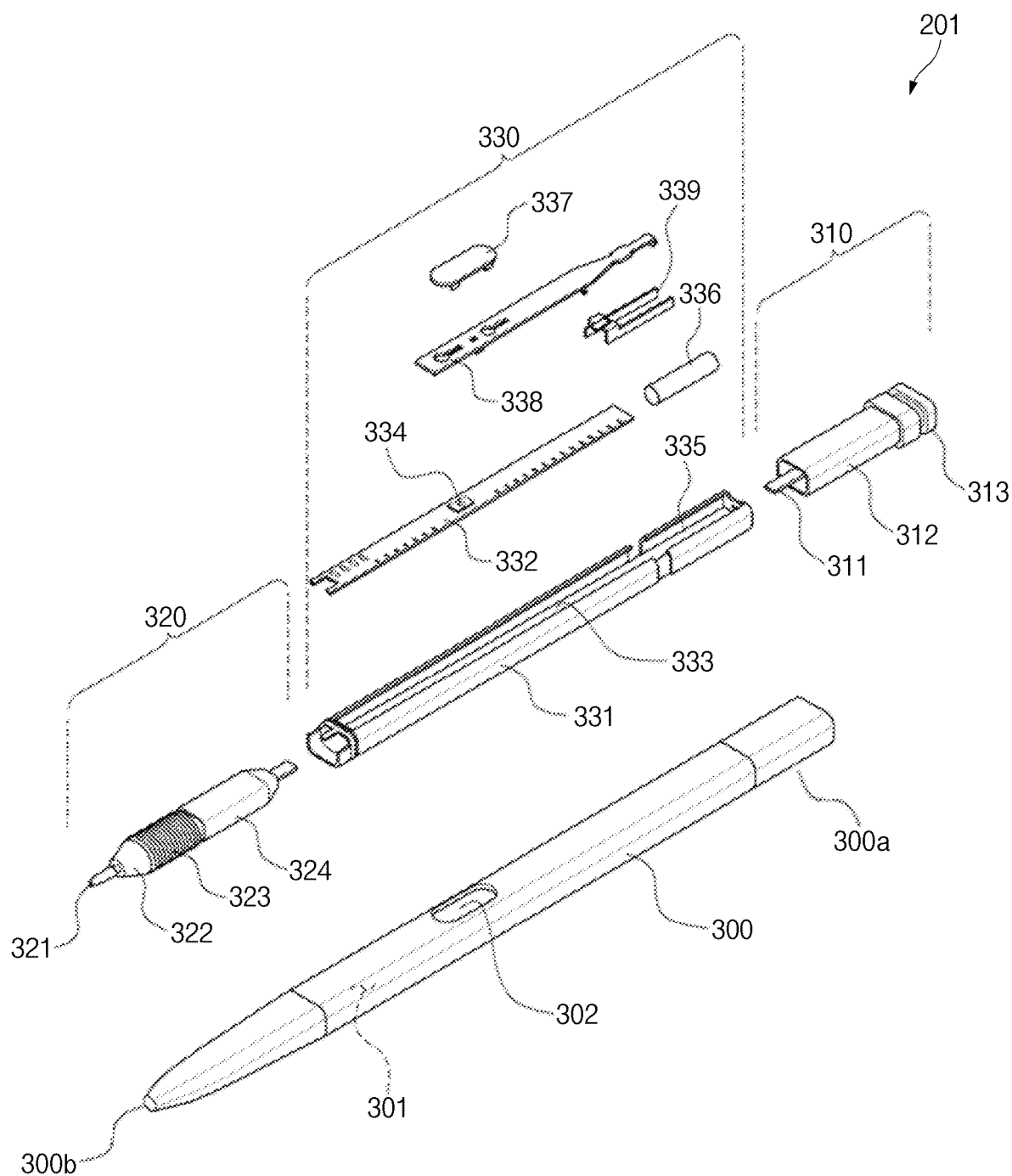
FIG. 4 is a block diagram of a digital pen, according to various embodiments.

FIG. 4 is a block diagram of the digital pen 201, according to various embodiments.

Referring to FIG. 4, the digital pen 201 may include a pen housing 300 forming the outer shape of the digital pen 201 and an inner assembly of the pen housing 300. In the illustrated embodiment, the inner assembly may include all of the various components mounted inside the pen and may be inserted into the pen housing 300 through a single assembling operation.

According to one embodiment, the pen housing 300 has a shape of longitudinally extending, between a first end portion 300a and a second end portion 300b and may include a receiving space 301 therein. The sectional surface of the pen housing 300 may have the shape of an oval having a longer axis and a shorter axis, and the pen housing 300 may be formed in the shape of an elliptic cylinder. Even the sectional surface of the receiving space 112 of the electronic device 101 may have the shape of an oval corresponding to the shape of the pen housing 300. The pen housing 300 may include a synthetic resin (e.g., plastic) and/or a metallic material (e.g., aluminum). According to one embodiment, the second end portion 300b of the pen housing 300 may be formed of a synthetic resin material.

According to an embodiment, the inner assembly may have a shape longitudinally extending to correspond to the shape of the pen housing 300. The inner assembly may be mainly divided into three components in a longitudinal direction. For example, the inner assembly may include an ejection member 310 disposed at a position corresponding to the first end portion 300a of the pen housing 300, a coil unit 320 disposed at a position corresponding to the second end portion 300b of the pen housing 300, and a circuit board unit 330 disposed at a position corresponding to the body of the housing.

According to one embodiment, the ejection member 310 may include a component to pull the digital pen 201 out of the receiving space 112 of the electronic device 101. According to an embodiment, the ejection member 310 may include a shaft 311, an ejection body 312 disposed around the shaft 311 and forming the overall outer appearance of the ejection member 310, and a button unit 313. When the inner assembly is completely inserted into the pen housing 300, the part including the shaft 311 and the ejection body 312 is surrounded by the first end portion 300a of the pen housing 300, and the button unit 313 (e.g., 201a in FIG. 2) may be exposed to the outside of the first end portion 300a. A plurality of components, such as cam members or elastic members, which are provided inside the ejection body 312, but not illustrated, may be disposed to form a push-pull structure. In one embodiment, the button unit 313 is actually coupled to the shaft 311 and is able to linearly reciprocate with respect to the ejection body 312. According to various embodiments, the button unit 313 may include a button having a locking structure such that a user releases the digital pen 201 using a nail. According to one embodiment, the digital pen 201 may include a sensor to sense a linear reciprocating motion of the shaft 311, thereby providing another input scheme.

According to an embodiment, the coil unit 320 may include a pen tip 321 exposed out of the second end portion 300b when the inner assembly is completely inserted into the pen housing 300, a packing ring 322, a coil 323 having a plurality of windings, and/or a pen pressure sensing unit 324 to obtain the change of pressure as the pen tip 321 applies pressure. The packing ring 322 may include epoxy, rubber, urethane, or silicone. The packing ring 322 may be provided for the purpose of waterproofing and dustproofing and may protect the coil unit 320 and the circuit board unit 330 from dust or from being infiltrated into water. According to one embodiment, the coil 323 may form a resonance frequency in a set frequency band (e.g., 500 kHz) and may be combined with at least one device (e.g., a capacitive device) to adjust a resonance frequency, which is formed by the coil 323, within a specific frequency range.

According to an embodiment, the circuit board unit 330 may include a printed circuit board 332, a base 331 surrounding at least one surface of the printed circuit board 332, and an antenna. According to an embodiment, a board seating part 333 to dispose the printed circuit board 332 is formed on a top surface of the base 331, and the printed circuit board 332 may be fixed in the state that the printed circuit board 332 is seated on the board seating part 333. According to an embodiment, the printed circuit board 332 may include a top surface and a bottom surface. A variable capacitor connected with the coil 323 or a switch 334 may be disposed on the top surface, and a charging circuit, a battery, or a communication circuit may be disposed on the bottom surface. The battery may include an electric double layered capacitor (EDLC). The charging circuitry, which is interposed between the coil 323 and the battery, may include a voltage detector circuit and a rectifier.

According to an embodiment, the antenna may include an antenna structure 339 and/or an antenna embedded in the printed circuit board 332, as illustrated in FIG. 4. According to various embodiments, the switch 334 may be provided on the printed circuit board 332. A side button 337 provided in the digital pen 201 may be used to press the switch 334, and may be exposed to the outside through a side opening part 302 of the pen housing 300. The side button 337 may be supported by a supporting member 338. When there is no external force acting on the side button 337, the supporting member 338 provides restoring force to return the side button 337 to a specific position of the side button 337 or to maintain the side button 337 at the specific position.

According to one embodiment, the circuit board unit 330 may include a different packing ring, such as an O-ring. For example, O-rings formed of an elastic material may be disposed at both ends of the base 331 to form a sealing structure between the base 331 and the pen housing 300. In an embodiment, the supporting member 338 may be partially in close contact with the inner wall of the pen housing 300 around the side opening part 302 to form a sealing structure. For example, the circuit board unit 330 may also form a waterproofing and dustproofing structure similar to that of the packing ring 322 of the coil unit 320.

According to one embodiment, the digital pen 201 may include a battery seating part provided on the top surface of the base 331 such that a battery 336 is disposed in the battery seating part. The battery 336, which is mounted on the battery seating part 335, may include, for example, a cylinder type battery.

According to an embodiment, the digital pen 201 may include a microphone (not illustrated). The microphone may be directly connected with the printed circuit board 332 or may be connected with a separate flexible printed circuit board (FPCB) (not illustrated) connected with the printed circuit board 332. According to various embodiments, the microphone may be disposed in a position parallel to the side button 337 in the longitudinal direction of the digital pen 201.

Figure 5A:
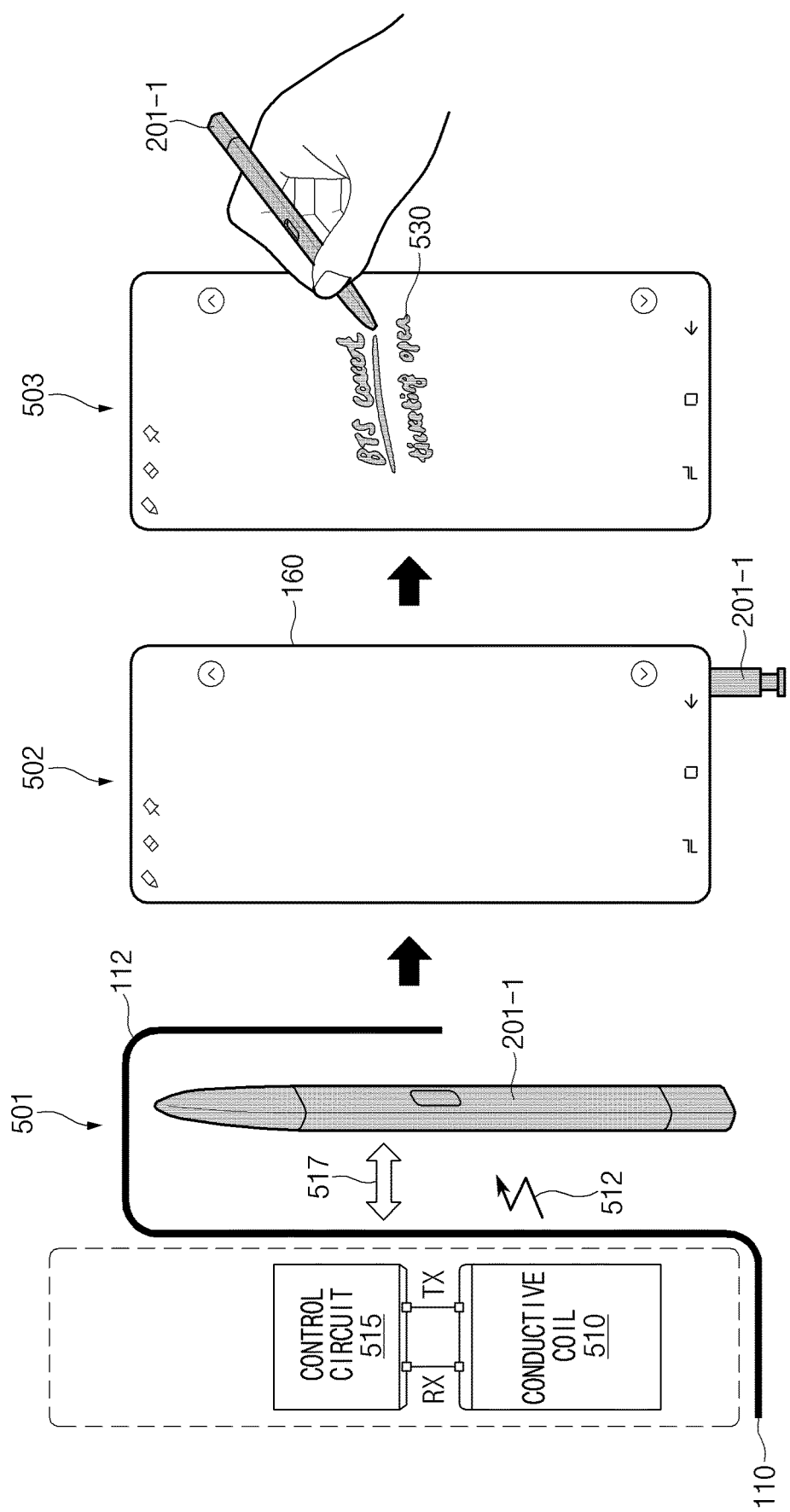
FIG. 5A illustrates an operation of displaying a stroke received through a first digital pen, according to various embodiments.
Figure 5B:
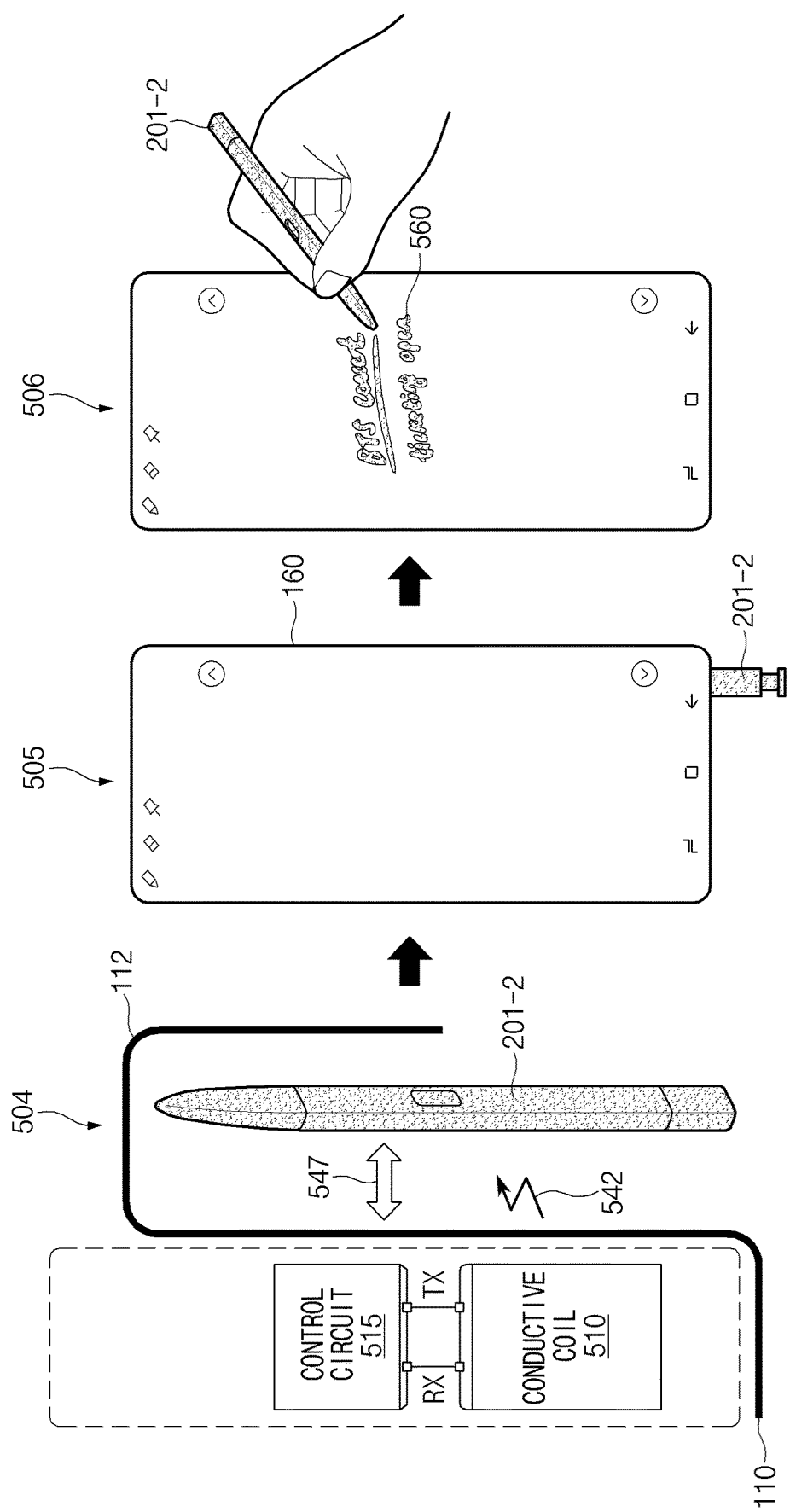
FIG. 5B illustrates an operation of displaying a stroke received through a second digital pen, according to various embodiments.

FIGS. 5A and 5B illustrate operations of displaying a stroke received through the digital pen 201, according to various embodiments. FIG. 5A illustrates an operation of displaying a stroke received through a first digital pen 201-1, and FIG. 5B illustrates an operation of displaying a stroke received through a second digital pen 201-2.

According to an embodiment, the first digital pen 201-1 and the second digital pen 201-2 may include features identical to or similar to the features of the digital pen (e.g., a stylus pen) illustrated in FIGS. 2 to 4, and may perform functions identical to or similar to the function of the digital pen illustrated in FIGS. 2 to 4. Outer appearances (e.g., at least one of the housing 300, the first end portion 300a, or the second end portion 300b of FIG. 4) of the first digital pen 201-1 and the second digital pen 201-2 may have mutually different colors. Although the following embodiments will be described on the assumption that the outer appearance of the first digital pen 201-1 has a first color (e.g., pink), and the outer appearance of the second digital pen 201-2 has a second color (e.g., scarlet), the type of colors is not limited to colors in embodiments to be described below.

Referring to FIG. 5A, operation 501 may correspond to FIG. 2. According to an embodiment, the first digital pen 201-1 may be inserted into the receiving space 112 of the electronic device 101, in the state that the display 160 (e.g., the display device 160 of FIG. 1) of the electronic device 101 is in an off state, or a part of the display 160 is in at least one (hereinafter, referred to as a "first state") of an off state (e.g., always on display (AOD)) or a locking state.

According to an embodiment, the electronic device 101 may further include a conductive coil 510 and a control circuit 515 to sense the first digital pen 201-1 (e.g., the digital pen 201 of FIG. 2) inserted into the receiving space 112.

According to an embodiment, the conductive coil 510 may perform an antenna function of transmitting and receiving a signal based on an electromagnetic induction scheme (e.g., EMR, AES, or ECR). The conductive coil 510 may be disposed inside the housing 110 or inside the receiving space 112.

According to an embodiment, the control circuit 515 may generate a signal based on the electromagnetic induction scheme or may process (or analyze) the received signal. According to an embodiment, the control circuit 515 may be at least a part of the processor 120 (or the auxiliary processor 123) of FIG. 1, or may be a separate module (or chip).

According to an embodiment, the electronic device 101 may detect whether the first digital pen 201-1 is attached or detached through a signal 512 based on an electromagnetic induction scheme. For example, the electronic device 101 may generate a signal having a specified frequency through the control circuit 515 and transmit the generated signal through the conductive coil 510. The signal transmitted to the first digital pen 201-1 may be induced by a resonance circuit (e.g., the resonance circuit 287 of FIG. 3) of the first digital pen 201-1. The electronic device 101 may receive a signal induced through the conductive coil 510. The electronic device 101 may identify whether the first digital pen 201-1 is inserted into or detached from the receiving space 112 by analyzing (or processing) a signal induced through the control circuit 515.

According to an embodiment, the electronic device 101 may establish a first wireless communication link 517 with the first digital pen 201-1 by using a wireless communication circuit (e.g., at least a portion of the wireless communication module 192 of FIG. 1) in the state that the first digital pen 201-1 is inserted into the receiving space 112. For example, the electronic device 101 may establish the first wireless communication link 517 based on a short-range wireless communication protocol. According to an embodiment, the short-range wireless communication protocol is, for example, a Bluetooth standard (or referred to as a Bluetooth legacy standard) defined by a Bluetooth special interest group (SIG), or a BLE (Bluetooth low energy) standard specification.

According to an embodiment, the electronic device 101 may receive a signal including color information of the first digital pen 201-1, from the first digital pen 201-1 through a wireless communication circuit and the first wireless communication link 517. According to an embodiment, the color information may include information on color, material, and finish (CMF). For example, the color information of the first digital pen 201-1 may indicate that the appearance of the first digital pen 201-1 has a first color (pink).

In operation 502, the electronic device 101 may sense that the first digital pen 201-1 is detached from the receiving space 112. When the first digital pen 201-1 is detached, the electronic device 101 may execute a memo function associated with the first digital pen 201-1.

According to an embodiment, a state in which the memo function associated with the first digital pen 201-1 is performed may be referred to as a second state. According to an embodiment, the memo function associated with the digital pen may be referred to as a screen off memo function. The second state may be a state in which some components (e.g., at least one of the digitizer or the control circuit 515 of the electronic device 101) used for receiving an input from a digital pen (e.g., 201) are activated, and some components of the display 160 (e.g., an organic light-emitting diode (OLED) or a liquid crystal display (LCD)) used for outputting a screen are deactivated. For example, when the screen off memo function is executed, the screen of the display 160 may not be output or a black background screen may be output. According to an embodiment, the screen off memo function may be performed while the electronic device 101 is maintained in a locking state.

In operation 503, the electronic device 101 may receive at least one stroke input onto the display 160 through the first digital pen 201-1 in the second state. The electronic device 101 may display a stroke 530, which is input through the first digital pen 201-1, with the first color (e.g., pink) identical to the color of the outer appearance of the first digital pen 201-1, based on the color information received in operation 501.

Referring to FIG. 5B, in operation 504, the second digital pen 201-2 may be inserted into the electronic device 101. According to an embodiment, in the first state of FIG. 5B, the second digital pen 201-2 may be inserted into the receiving space 112 of the electronic device 101. According to an embodiment, the electronic device 101 may sense that the second digital pen 201-2 is inserted into the receiving space 112 through a signal 542 based on an electromagnetic induction scheme using the conductive coil 510 and the control circuit 515.

According to an embodiment, the electronic device 101 may release the first wireless communication link 517 and may establish a second wireless communication link 547 with the second digital pen 201-2 through a wireless communication circuit, in response to sensing that the second digital pen 201-2 is inserted. For example, the electronic device 101 may establish the second wireless communication link 547 based on a short-range wireless communication protocol. The short-range wireless communication protocol may be based on, for example, a Bluetooth or BLE standard specification.

According to an embodiment, the electronic device 101 may receive a signal including color information of the second digital pen 201-2, from the second digital pen 201-2 through the wireless communication circuit and the second wireless communication link 547. According to an embodiment, the color information may include information on CMF. For example, the color information of the second digital pen 201-2 may indicate that the outer appearance of the second digital pen 201-2 has the second color (scarlet).

In operation 505, the electronic device 101 senses that the second digital pen 201-2 is detached from the receiving space 112, and performs a memo function association with the second digital pen 201-2. According to an embodiment, the memo function associated with the second digital pen 201-2 may be referred to as a screen off memo function. The electronic device 101 may control the display 160 to prevent the screen from being output or to output the black background screen, while maintaining the digitizer to be activated to receive a drawing input of the second digital pen 201-2, in the state (e.g., the second state) that the screen off memo function is performed.

In operation 506, the electronic device 101 may receive at least one stroke input onto the display 160 through the second digital pen 201-2 in the state that the screen off memo function is executed. The electronic device 101 may display a stroke 560, which is input through the second digital pen 201-2, with the second color (e.g., scarlet) identical to the color of the outer appearance of the second digital pen 201-2, based on color information received in operation 504.

Through the operations of FIG. 5A to FIG. 5B, the electronic device 101 displays, with mutually different colors, drawing inputs (or stroke inputs) of mutually different digital pens, thereby providing, to a user, a guide to the digital pen linked with the electronic device 101 based on the short-range wireless communication protocol.

Figure 6:
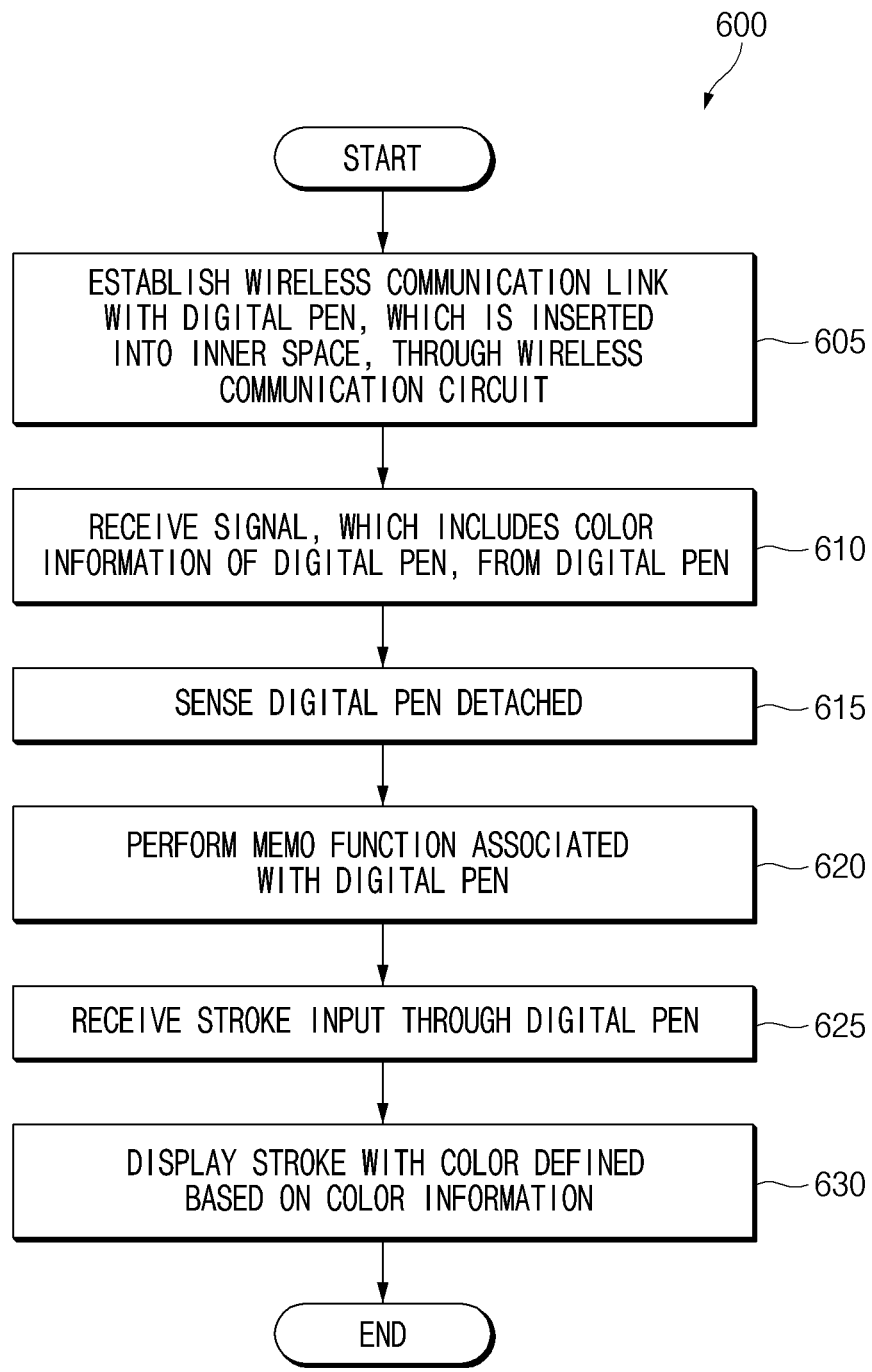
FIG. 6 is a flowchart illustrating an operation of an electronic device to display a stroke received through a digital pen, according to various embodiments.

FIG. 6 is a flowchart 600 illustrating an operation of the electronic device 101 to display a stroke received through the digital pen 201 according to various embodiments. Hereinafter, operations illustrated in FIG. 6 or another flowchart may be performed by the electronic device 101 or a component of the electronic device 101. The component of the electronic device 101 may include, for example, at least one of a hardware component (e.g., the processor 120) or a software component (e.g., the application layer 146 or the middle ware 144) of the components illustrated in FIG. 1.

Referring to FIG. 6, in operation 605 of flowchart 600, the electronic device 101 may establish a wireless communication link (e.g., the first wireless communication link 517 of FIG. 5A or the second wireless communication link 547 of FIG. 5B) with the digital pen 201 (e.g., the first digital pen 201-1 of FIG. 5A or the second digital pen 201-2 of FIG. 5B) inserted into the inner space through the wireless communication circuit (e.g., at least a portion of the wireless communication module 192 of FIG. 1).

In operation 610, the electronic device 101 may receive a signal, which includes color information of the digital pen 201, from the digital pen 201 through the wireless communication circuit and the wireless communication link. The color information may indicate the color information (e.g., pink or scarlet) of the outer appearance of the digital pen 201.

In operation 615, the electronic device 101 may sense that the digital pen 201 is detached from the inner space. According to an embodiment, the electronic device 101 may sense that the digital pen 201 is detached through an electromagnetic induction scheme.

In operation 620, the electronic device 101 may perform a memo function associated with the digital pen 201 in response to the detachment of the digital pen 201. When the memo function associated with the digital pen 201 is performed, the screen of the display 160 may not be output or a black background screen may be output, and a digitizer configured to receive an input of the digital pen 201 may be activated.

In operation 625, the electronic device 101 may receive a stroke input (or drawing input) onto the display 160 through the digital pen 201, in the state that the memo function associated with the digital pen 201 is performed.

In operation 630, the electronic device 101 may display, on the display 160, the received stroke input with a color defined based color information in response to that the stroke input is received.

Figure 7:
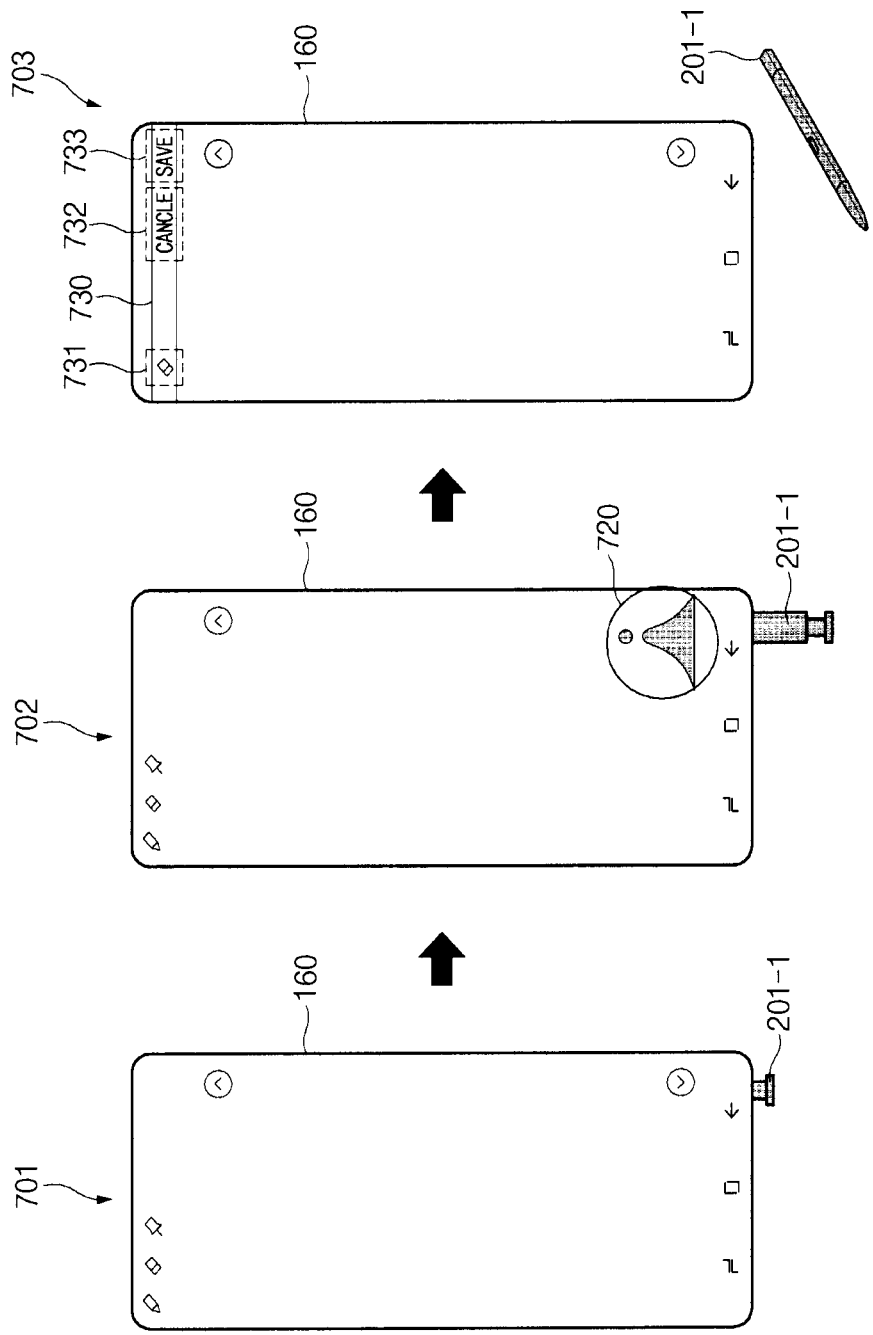
FIG. 7 illustrates a user interface (UI) associated with a memo function, according to various embodiments.

FIG. 7 illustrates a UI 730 associated with a memo function, according to various embodiments. Although FIG. 7 illustrates the UI 730 associated with the memo function of the first digital pen 201-1, the similar principle may be applied to the memo function of the second digital pen 201-2.

Referring to FIG. 7, in operation 701, the first digital pen 201-1 may be inserted into the electronic device 101. According to an embodiment, the electronic device 101 may include the first digital pen 201-1 which is in the first state of FIG. 5A. The first state may include, for example, at least one of a state that the display 160 is turned off, a state (e.g., AOD) that a portion of the display 160 is turned off, or a locking state.

In operation 702, the electronic device 101 may sense that the first digital pen 201-1 is at least partially detached from the electronic device 101. According to an embodiment, the electronic device 101 may identify, through the signal based on the electromagnetic induction scheme, whether the first digital pen 201-1 is fully inserted, whether the first digital pen 201-1 is at least partially detached, or whether the first digital pen 201-1 is completely detached. When the first digital pen 201-1 is at least partially detached, the electronic device 101 may display a GUI 720 indicating that the first digital pen 201-1 is at least partially detached, on an area corresponding to an area (e.g., a right lower portion), in which a hole (e.g., the hole 111 of FIG. 2) or the receiving space (e.g., the receiving space 112 of FIG. 2) is positioned, of the display 160. According to an embodiment, the electronic device 101 may control the GUI 720 to have color (e.g., pink) defined based on color information of the first digital pen 201-1, based on color information received from the first digital pen 201-1.

When the first digital pen 201-1 is completely detached from the receiving space, in operation 703, the electronic device 101 may release displaying the GUI 720 and may perform the memo function (e.g., the screen off memo function) associated with the first digital pen 201-1. According to an embodiment, the electronic device 101 may display the UI 730, which is associated with the memo function, on an area (e.g., an upper portion) of the display 160. According to an embodiment, the first UI 730 may include a plurality of objects 731, 732, and 733 to provide mutually different functions. When the first object 731 is received, the electronic device 101 may delete at least a portion of a stroke (e.g., the stroke 530 of FIG. 5A) displayed based on the input of the first digital pen 201-1. When the second object 732 is received, the electronic device 101 may initialize the displayed stroke. In other words, the electronic device may perform a control operation such that an entire portion of the stroke is deleted. When the third object 733 is received, the electronic device 101 may store information associated the displayed stroke in a memory (e.g., the memory 130 of FIG. 1). According to an embodiment, the electronic device 101 may store the color information of the first digital pen 201-1 in the memory, together with the information associated with the stroke.

Figure 8:
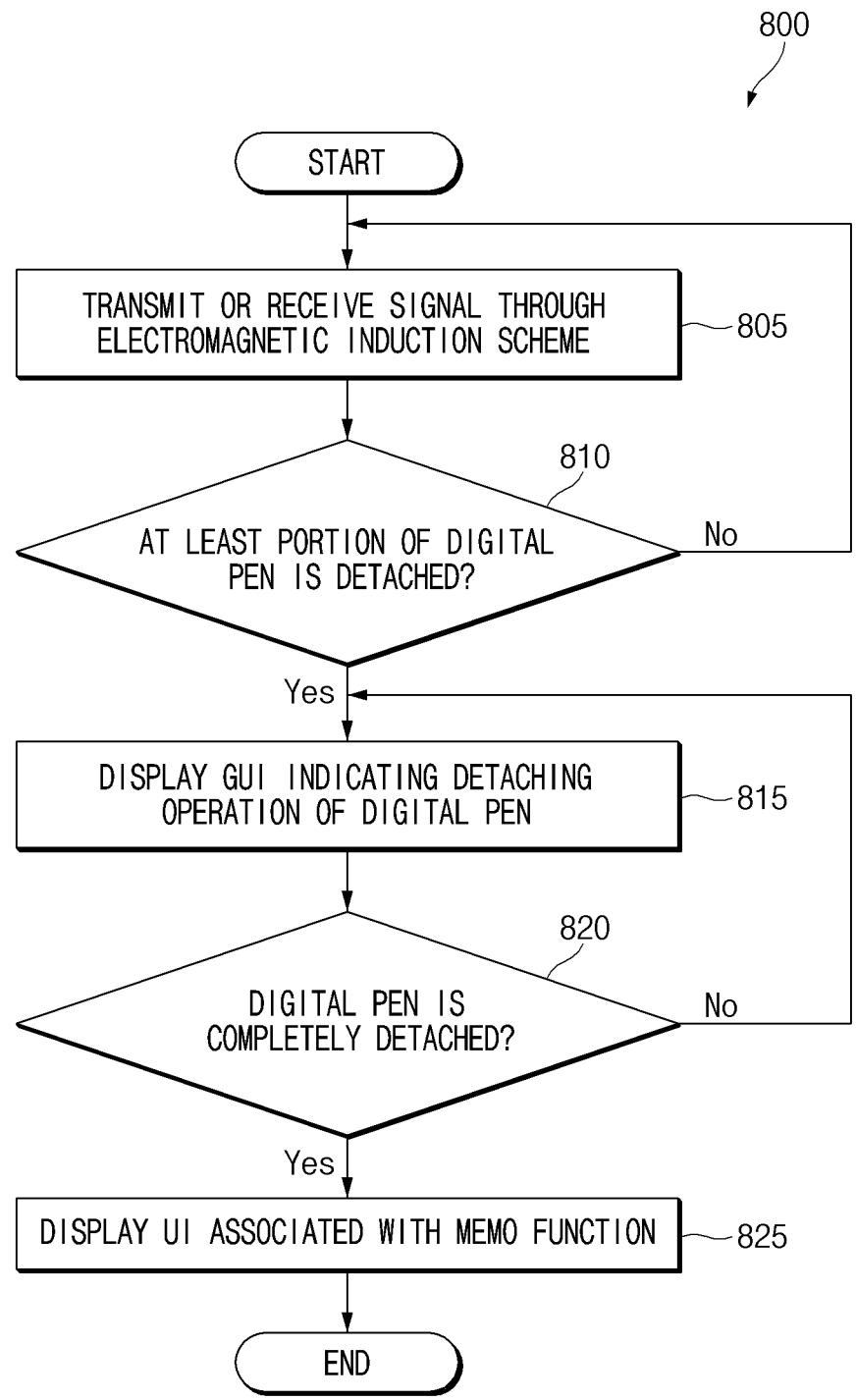
FIG. 8 illustrates a flowchart of an operation of an electronic device to display a UI associated with a memo function, according to various embodiments.

FIG. 8 illustrates a flowchart 800 of an operation of the electronic device 101 to display the UI 730 associated with the memo function, according to various embodiments. The operations illustrated in FIG. 8 may be performed as an example of operations 615 to 620 of FIG. 6.

Referring to the flowchart 800 of FIG. 8, in operation 805, the electronic device 101 may transmit or receive a signal through an electromagnetic induction scheme, to sense that the digital pen 201 (e.g., the first digital pen 201-1 or the second digital pen 201-2) is attached or detached.

In operation 810, the electronic device 101 may identify whether at least a portion of the digital pen 201 is detached, through the signal transmitted or received through the electromagnetic induction scheme. When the at least a portion of the digital pen 201 is not detached (when the digital pen 201 is completely inserted into the receiving space 112), the electronic device 101 may repeatedly perform operation 805 and operation 810.

When at least a portion of the digital pen 201 is detached, in operation 815, the electronic device 101 may display the GUI 720 indicating detachment operation of the digital pen 201, on the display 160. According to an embodiment, the electronic device 101 may perform a control operation such that the color of the GUI 720 is the same as the color indicated by color information of the digital pen 201.

In operation 820, the electronic device 101 may identify whether the digital pen 201 is completely detached from the electronic device 101. According to an embodiment, the electronic device 101 may identify whether the digital pen 201 is completely detached, through the electromagnetic induction scheme. When the digital pen 201 is not completely detached, the electronic device 101 may repeatedly perform operation 815 and operation 820.

When the digital pen 201 is completely detached, in operation 825, the electronic device 101 may display, on one area of the display 160, the UI 730 associated with the memo function (e.g., the screen off memo function) of the digital pen 201.

Figure 9:
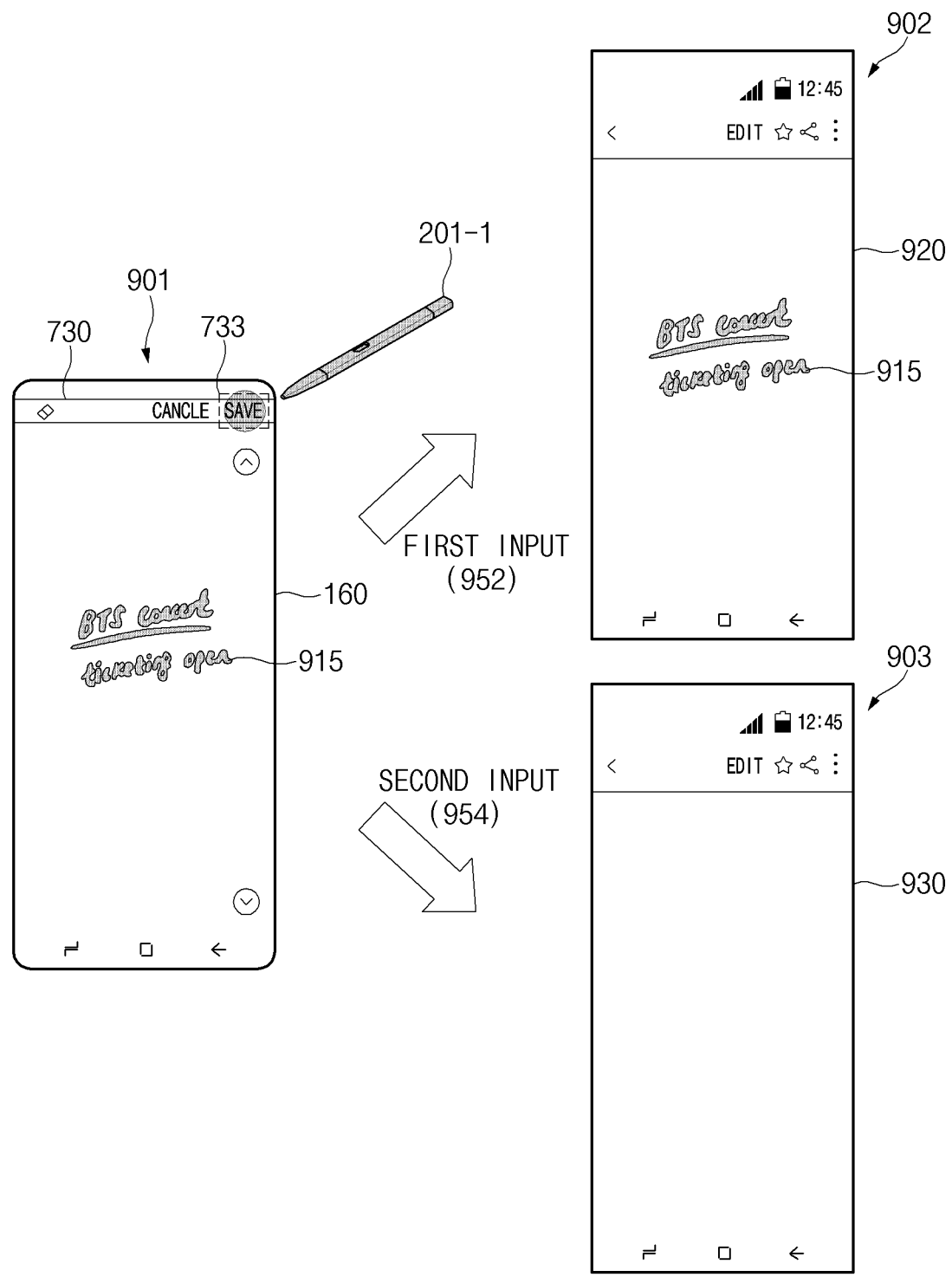
FIG. 9 illustrates an operation of performing a memo application, according to various embodiments.

FIG. 9 illustrates an operation of performing a memo application, according to various embodiments.

Referring to FIG. 9, operation 901 may correspond to operation 503 of FIG. 5A. The electronic device 101 may display a stroke 915 resulting from the stroke input through the first digital pen 201-1 in the second state, on the display 160, based on the color information of the first digital pen 201-1. According to an embodiment, the electronic device 101 may receive a user input to select the third object 733 in the state that the stroke 915 is displayed. The user input to select the third object 733 may include, for example, a touch input through the first digital pen 201-1 or a touch input through a body part (e.g., a finger) of the user. The electronic device 101 may store information associated with the stroke 915 and color information of the first digital pen 201-1 in a memory (e.g., the memory 130 of FIG. 1), in response to the user input to select the third object 733.

According to one embodiment, the electronic device 101 may perform a memo application stored in the memory 130 of the electronic device 101, based on a user input. According to an embodiment, the electronic device 101 may release the locking state and perform the memo application.

According to an embodiment, the electronic device 101 may respectively display execution screens of mutually different memo applications based on mutually different user inputs.

For example, the electronic device 101 may display a first screen 920 including the stroke 915 in response to a first input 952, in operation 902. The first input 952 may include, for example, an input to press the user interface (e.g., the side button 337 of FIG. 4) of the first digital pen 201-1 in the first state (or the second state). According to an embodiment, when the electronic device 101 is in a locking state, the electronic device 101 may unlock the locking state and may display the first screen 920. The first screen 920 may include a background screen associated with the memo application and the stroke 915. The electronic device 101 may display, on the first screen 920, the stroke 915 having the same color as the color of an outer appearance of the first digital pen 201-1, by loading information regarding the stroke 915, which is stored based on the user input to select the third object 733, and the color information of the first digital pen 201-1.

For example, the electronic device 101 may display a second screen 930, in response to a second input 954, in operation 903. The second input 954 may include user inputs for unlocking the locking state of the electronic device 101 and for executing the memo application. The second screen 930 may include a screen to execute the memo application displayed before the first state. In other words, the second screen 930 may include the execution screen of the memo application, which is lately displayed through the display 160. The second screen 930 may include a background screen associated with the memo application. Although not illustrated in FIG. 9, the electronic device 101 may display a stroke with a preset color (e.g., block or gray) or a color determined through the user input, when receiving the stroke input through the first digital pen 201-1 in the state that the second screen 930 is displayed.

Figure 10:
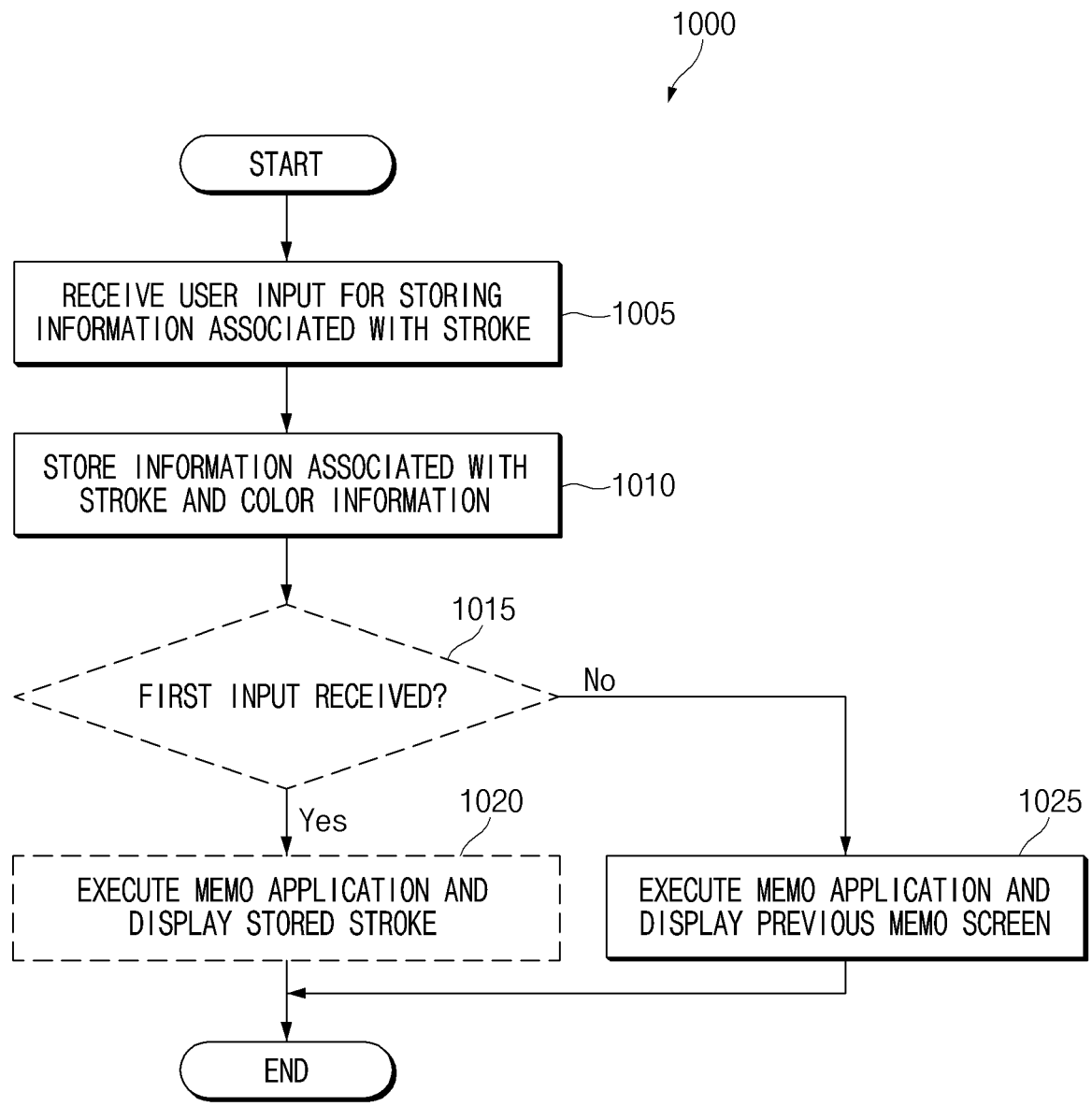
FIG. 10 illustrates a flowchart of an operation of an electronic device to execute a memo application, according to various embodiments.

FIG. 10 illustrates a flowchart of the operations of the electronic device 101 to execute a memo application, according to various embodiments. The operations illustrated in FIG. 10 may be performed after operation 630 of FIG. 6 or operation 825 of FIG. 8.

Referring to FIG. 10, in operation 1005 of flowchart 1000, the electronic device 101 may receive a user input to store information regarding the stroke 915. For example, the electronic device 101 may receive the third object 733 of FIG. 7 in the state that the stroke 915 is displayed.

The electronic device 101 may store the information associated with the stroke 915 and color information of the digital pen 201 (e.g., the first digital pen 201-1 of FIG. 9) in the memory (e.g., the memory 130 of FIG. 1), in operation 1010, in response to receiving the user input.

In operation 1015, the electronic device 101 may receive the first input 952 or the second input 954. When receiving the first input 952, in operation 1020, the electronic device 101 may execute the memo application, and may display the stroke 915 having the same color as that of the outer appearance of the digital pen 201, on the execution screen of the memo application, based on the information regarding the stroke 915 and the color information, which are stored. When receiving the second input 954, in operation 1025, the electronic device 101 may execute the memo application and may display a previous memo screen (a previous execution screen of the memo application). According to an embodiment, the electronic device 101 may omit operation 1015 and operation 1020.

As described above, an electronic device (e.g., the electronic device 101 in FIG. 1) may include a housing (e.g., the housing 110 in FIG. 2), a display (e.g., the display 160 in FIG. 1) viewed through a portion of the housing, a wireless communication circuit (e.g., at least a portion of the wireless communication module 192 in FIG. 1) positioned inside the housing, a processor (e.g., the processor 120 of FIG. 1) positioned in the housing and operationally connected with the display and the wireless communication circuit, and a memory (e.g., the memory 130 in FIG. 1) positioned inside the housing, and operationally connected with the processor. The memory may store instructions that when executed, cause the processor to establish a wireless communication link (e.g., the first wireless communication link 517 in FIG. 5A or the second wireless communication link 547 in FIG. 5B) with a stylus pen (e.g., the first digital pen 201-1 in FIG. 5A or the second digital pen 201-2 in FIG. 5B), which is inserted into an inner space of the housing, based on a short-range wireless communication protocol, through the wireless communication circuit, receive a signal including color information of the stylus pen from the stylus pen, through the wireless communication circuit and the short-range wireless communication protocol, sense that the stylus pen is detached from the housing, perform a memo function associated with the stylus pen, in response to the detaching of the stylus pen, receive at least one stroke input onto the display through the stylus pen, and display at least one stroke with a color defined based on the color information, in response to the received stroke input.

According to an embodiment, the memo function associated with the stylus pen may be performed in a state that a portion of the display is turned off.

According to an embodiment, the memo function associated with the stylus pen may be performed in a state that the display maintains a black background.

According to an embodiment, the display may be implemented with an organic light-emitting diode (OLED) or a liquid crystal display (LCD).

According to an embodiment, the memo function associated with the stylus pen may be performed in a state that the electronic device is maintained in a locking state According to an embodiment, the instructions may cause the processor to display a first object (e.g., the third object 733 in FIG. 7), which is for storing information on the at least one stroke input, on one area of the display and store, in a memory, the information on the at least one stroke input, together with the color information, in response to a user input of selecting the first object.

According to an embodiment, the instructions cause the processor to display, on one area of the display, at least one of a second object (e.g., the first object 731 in FIG. 7) for deleting a portion of the at least one stroke and a third object (e.g., the second object 732 in FIG. 7) for initializing the at least one stroke which is displayed.

According to an embodiment, the instructions cause the processor to execute a memo application associated with the stylus pen, and an execution screen (e.g., the first screen 920 in FIG. 9) of the memo application includes a specified background screen and the at least one stroke which is displayed on the display with the color when the memo function is executed.

According to an embodiment, the instructions cause the processor to execute a memo application associated with the stylus pen, receive a user input for selecting a first color, receive a memo input onto an execution screen (e.g., the second screen 930 in FIG. 9) of the memo application, through the stylus pen, and display, on the display, at least one second stroke, which corresponds to the memo input, with the first color.

According to an embodiment, the instructions cause the processor to execute a memo application associated with the stylus pen, receive a memo input onto an execution screen of the memo application, through the stylus pen, and display the memo input with a color, which is specified based on the color information, onto the display.

As described above, a method of an electronic device (e.g., the electronic device 101 in FIG. 1), may include establishing a wireless communication link (e.g., the first wireless communication link 517 in FIG. 5A or the second wireless communication link 547 in FIG. 5B), which is based on a short-range wireless communication protocol, with a stylus pen (e.g., the first digital pen 201-1 in FIG. 5A or the second digital pen 201-2 in FIG. 5B), receiving a signal, which includes color information of the stylus pen, from the stylus pen, through the short-range wireless communication protocol, sensing that the stylus pen is detached from an inner space of the electronic device, performing a memo function associated with the stylus pen, in response to the detaching of the stylus pen, receiving at least one stroke input onto a display of the electronic device through the stylus pen, and displaying at least one stroke with a color, which is specified from the color information, in response to the received stroke input.

According to an embodiment, the memo function associated with the stylus pen may be performed in a state that a portion of the display is turned off.

According to an embodiment, the method may further include displaying a first object for storing information, on the at least one stroke input on one area of the display, and storing, in the memory, the information on the at least one stroke input, together with the color information, in response to a user input for selecting the first object.

According to an embodiment, the method may further include displaying, on one area of the display, at least one of a second object for deleting a portion of the at least one stroke, which is displayed, and a third object for initializing the at least one stroke which is displayed.

According to an embodiment, the method may further include executing a memo application associated with the stylus pen. The execution screen of the memo application includes a specified background screen and the at least one stroke which is displayed on the display with the color when the memo function is executed.

As described above, an electronic device (e.g., the electronic device 101 in FIG. 1) may include a housing (e.g., the housing 110 in FIG. 2), a display (e.g., at least a portion of the display 160 in FIG. 1) viewed through a portion of the housing, a wireless communication circuit (e.g., at least a portion of the wireless communication module 192 in FIG. 1) positioned inside the housing, a processor (e.g., the processor 120 of FIG. 1) positioned in the housing and operationally connected with the display and the wireless communication circuit, and a memory (e.g., the memory 130 in FIG. 1) positioned inside the housing, and operationally connected with the processor. The memory may store instructions that when executed, cause the processor to establish a wireless communication link (e.g., the first wireless communication link 517 in FIG. 5A or the second wireless communication link 547 in FIG. 5B) with a stylus pen (e.g., the first digital pen 201-1 in FIG. 5A or the second digital pen 201-2 in FIG. 5B), which is detachably inserted into an inner space of the housing, based on a short-range wireless communication protocol, through the wireless communication circuit, receive a signal including color information of the stylus pen from the stylus pen, through the wireless communication circuit and the short-range wireless communication protocol, perform a memo function or a memo application associated with the stylus pen, receive at least one stroke input which is to be input onto the display through the stylus pen, and display, through the display, at least one stroke with a color defined based on the color information, in response to the received stroke input.

According to an embodiment, the memo function associated with the stylus pen may be performed in a state that a portion of the display is turned off.

According to an embodiment, the memo function associated with the stylus pen may be performed in a state that the display maintains a black background.

According to an embodiment, the display may be implemented with an OLED or an LCD.

According to an embodiment, the memo function associated with the stylus pen may be performed in a state that the electronic device is maintained in a locking state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operationally" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
a display viewed through a portion of the housing;
a wireless communication circuit positioned inside the housing;
a processor positioned in the housing and operationally connected with the display and the wireless communication circuit; and
a memory positioned inside the housing, and operationally connected with the processor,
wherein the memory stores instructions that when executed, cause the processor to:
establish a wireless communication link with a stylus pen, which is inserted into an inner space of the housing, based on a short-range wireless communication protocol, through the wireless communication circuit;
receive a signal including color information indicating a color of an outer appearance of the stylus pen from the stylus pen, through the wireless communication circuit and the short-range wireless communication protocol;
perform a memo function associated with the stylus pen, in response to sensing that the stylus pen is detached from the housing;
receive at least one stroke input onto the display through the stylus pen; and
display, based on the received signal, at least one stroke having a same color as that of the outer appearance of the stylus pen, in response to the received at least one stroke input.

2. The electronic device of claim 1, wherein the memo function associated with the stylus pen is performed in a state that a portion of the display is turned off.

3. The electronic device of claim 1, wherein the memo function associated with the stylus pen is performed in a state that the display maintains a black background.

4. The electronic device of claim 1, wherein the display is implemented with an organic light-emitting diode (OLED) or a liquid crystal display (LCD).

5. The electronic device of claim 1, wherein the memo function associated with the stylus pen is performed in a state that the electronic device is maintained in a locking state.

6. The electronic device of claim 1, wherein the instructions cause the processor to:
display a first object for storing information on the at least one stroke input, on one area of the display; and
store, in the memory, the information on the at least one stroke input together with the color information, in response to a user input of selecting the first object.

7. The electronic device of claim 1, wherein the instructions cause the processor to:
display, on one area of the display, at least one of a second object for deleting a portion of the at least one stroke and a third object for initializing the at least one stroke which is displayed.

8. The electronic device of claim 6, wherein the instructions cause the processor to:
execute a memo application associated with the stylus pen after storing the information on the at least one stroke input together with the color information, and
wherein an execution screen of the memo application includes a specified background screen and the at least one stroke which is displayed on the display with the color when the memo function is executed.

9. The electronic device of claim 1, wherein the instructions cause the processor to:
execute a memo application associated with the stylus pen after displaying at least one stroke having the same color as that of the outer appearance of the stylus pen;
receive a memo input onto an execution screen of the memo application, through the stylus pen;
determine whether a user input for selecting a specific color different from the color of the outer appearance of the stylus pen; and
in response to receiving the user input for selecting the specific color, display, on the display, at least one second stroke having the specific color, which corresponds to the memo input.

10. The electronic device of claim 1, wherein the instructions cause the processor to:
execute a memo application associated with the stylus pen after displaying at least one stroke having the same color as that of the outer appearance of the stylus pen;
receive a memo input onto an execution screen of the memo application, through the stylus pen; and
display, at least one second stroke having the same color as that of the outer appearance of the stylus pen, which corresponds to the memo input.

11. A method of an electronic device, the method comprising:
establishing a wireless communication link, which is based on a short-range wireless communication protocol, with a stylus pen;
receiving a signal, which includes color information indicating a color of an outer appearance of the stylus pen, from the stylus pen, through the short-range wireless communication protocol;
performing a memo function associated with the stylus pen, in response to sensing that the stylus pen is detached from a housing of the electronic device;
receiving at least one stroke input onto a display of the electronic device through the stylus pen; and
displaying, based on the received signal, at least one stroke having a same color as that of the outer appearance of the stylus pen, in response to the received at least one stroke input.

12. The method of claim 11, wherein the memo function associated with the stylus pen is performed in at least one of a state that a portion of the display is turned off, a state that the display maintains a black background or a state that the electronic device is maintained in a locking state.

13. The method of claim 11, further comprising:
displaying a first object for storing information on the at least one stroke input, on one area of the display; and
storing, in a memory, the information on the at least one stroke input, together with the color information, in response to a user input for selecting the first object.

14. The method of claim 11, further comprising:
displaying, on one area of the display, at least one of a second object for deleting a portion of the at least one stroke, which is displayed, and a third object for initializing the at least one stroke which is displayed.

15. The method of claim 11, further comprising:
executing a memo application associated with the stylus pen,
wherein an execution screen of the memo application includes a specified background screen and the at least one stroke which is displayed on the display with the color when the memo function is executed.

16. The electronic device of claim 1, wherein the instructions cause the processor to:
- in response to receiving the signal including first color information indicating that the outer appearance of the stylus pen has a first color, display at least one stroke having the first color; and
- in response to receiving the signal including second color information indicating that the outer appearance of the stylus pen has a second color, display at least one stroke having the second color.

17. The electronic device of claim 1, wherein the instructions cause the processor to:
- in response to sensing that the stylus pen is detached from the housing, display, through the display, graphical information having the same color as that of the outer appearance of the stylus pen and indicating that the stylus pen is at least partially detached.

\* \* \* \* \*